US009591022B2

(12) United States Patent
Purpura

(10) Patent No.: US 9,591,022 B2
(45) Date of Patent: Mar. 7, 2017

(54) COMPUTER DEFENSES AND COUNTERATTACKS

(71) Applicant: The Boeing Company, Chicago, IL (US)

(72) Inventor: William J. Purpura, Anaheim, CA (US)

(73) Assignee: THE BOEING COMPANY, Chicago, IL (US)

( * ) Notice: Subject to any disclaimer, the term of this patent is extended or adjusted under 35 U.S.C. 154(b) by 134 days.

(21) Appl. No.: 14/574,076

(22) Filed: Dec. 17, 2014

(65) Prior Publication Data

US 2016/0182533 A1 Jun. 23, 2016

(51) Int. Cl.
*H04L 29/06* (2006.01)

(52) U.S. Cl.
CPC ........ *H04L 63/145* (2013.01); *H04L 63/1408* (2013.01); *H04L 63/1441* (2013.01)

(58) Field of Classification Search
CPC H04L 63/1408; H04L 63/145; H04L 63/1441
See application file for complete search history.

(56) References Cited

U.S. PATENT DOCUMENTS

| | | | |
|---|---|---|---|
| 5,881,131 A | 3/1999 | Farris et al. | |
| 6,112,181 A | 8/2000 | Shear et al. | |
| 6,339,832 B1 | 1/2002 | Bowman-Amuah | |
| 6,351,811 B1 | 2/2002 | Groshon et al. | |
| 6,408,391 B1 | 6/2002 | Huff et al. | |
| 6,434,568 B1 | 8/2002 | Bowman-Amuah | |
| 6,539,101 B1 | 3/2003 | Black | |
| 6,539,396 B1 | 3/2003 | Bowman-Amuah | |
| 6,549,949 B1 | 4/2003 | Bowman-Amuah | |
| 6,550,057 B1 | 4/2003 | Bowman-Amuah | |
| 6,640,249 B1 | 10/2003 | Bowman-Amuah | |
| 6,708,212 B2 | 3/2004 | Porras et al. | |

(Continued)

FOREIGN PATENT DOCUMENTS

WO 2004023714 A2 3/2004

OTHER PUBLICATIONS

Perception: Bio-inspired Cyber Defence, Chemring Group, 2014, 8 pages.

(Continued)

*Primary Examiner* — Mohammad A Siddiqi
(74) *Attorney, Agent, or Firm* — Toler Law Group, PC

(57) ABSTRACT

A method includes instantiating a first detection agent based on detection criteria, where the first detection agent includes first program code executable by a second computing device to monitor network activity. The method further includes sending the first program code of the first detection agent to the second computing device for execution. When the first program code of the first detection agent is executed at the second computing device, the first detection agent causes network activity data to be transmitted to a network monitor, and the network monitor updates the detection criteria based on the network activity data to generate updated detection criteria. The method also includes instantiating a second detection agent based on the updated detection criteria and sending second program code of the second detection agent to the second computing device for execution.

20 Claims, 6 Drawing Sheets

(56) References Cited

U.S. PATENT DOCUMENTS

| | | |
|---|---|---|
| 6,742,015 B1 | 5/2004 | Bowman-Amuah |
| 6,839,850 B1 | 1/2005 | Campbell et al. |
| 6,842,906 B1 | 1/2005 | Bowman-Amuah |
| 6,847,737 B1 | 1/2005 | Kouri et al. |
| 6,938,021 B2 | 8/2005 | Shear et al. |
| 6,981,146 B1 | 12/2005 | Sheymov |
| 6,983,221 B2 | 1/2006 | Tracy et al. |
| 6,993,448 B2 | 1/2006 | Tracy et al. |
| 7,043,633 B1 | 5/2006 | Fink et al. |
| 7,066,382 B2 | 6/2006 | Kaplan |
| 7,089,303 B2 | 8/2006 | Sheymov et al. |
| 7,092,914 B1 | 8/2006 | Shear et al. |
| 7,107,322 B1 | 9/2006 | Freeny, Jr. |
| 7,107,347 B1 | 9/2006 | Cohen |
| 7,110,983 B2 | 9/2006 | Shear et al. |
| 7,120,931 B1 | 10/2006 | Cheriton |
| 7,124,372 B2 | 10/2006 | Brin |
| 7,130,466 B2 | 10/2006 | Seeber |
| 7,143,066 B2 | 11/2006 | Shear et al. |
| 7,197,563 B2 | 3/2007 | Sheymov et al. |
| 7,213,766 B2 | 5/2007 | Ryan et al. |
| 7,222,062 B2 | 5/2007 | Goud et al. |
| 7,237,264 B1 | 6/2007 | Graham et al. |
| 7,289,964 B1 | 10/2007 | Bowman-Amuah |
| 7,296,274 B2 | 11/2007 | Cohen et al. |
| 7,322,028 B2 | 1/2008 | Belovich |
| 7,325,252 B2 | 1/2008 | Bunker, V et al. |
| 7,392,079 B2 | 6/2008 | Donoghue et al. |
| 7,406,713 B2 | 7/2008 | Sheymov et al. |
| 7,437,408 B2 | 10/2008 | Schwartz et al. |
| 7,437,766 B2 | 10/2008 | Cohen et al. |
| 7,441,275 B2 | 10/2008 | McCallam et al. |
| 7,450,005 B2 | 11/2008 | Anand et al. |
| 7,454,790 B2 | 11/2008 | Potok |
| 7,506,166 B2 | 3/2009 | Sheymov |
| 7,516,227 B2 | 4/2009 | Cohen |
| 7,526,807 B2 | 4/2009 | Chao et al. |
| 7,530,105 B2 | 5/2009 | Gilbert et al. |
| 7,533,186 B2 | 5/2009 | Raman |
| 7,546,638 B2 | 6/2009 | Anderson et al. |
| 7,549,167 B1 | 6/2009 | Huang et al. |
| 7,552,419 B2 | 6/2009 | Zimmer et al. |
| 7,565,549 B2 | 7/2009 | Satterlee et al. |
| 7,574,740 B1 | 8/2009 | Kennis |
| 7,590,688 B2 | 9/2009 | Franke |
| 7,594,009 B2 | 9/2009 | Triulzi et al. |
| 7,594,260 B2 | 9/2009 | Porras et al. |
| 7,594,270 B2 | 9/2009 | Church et al. |
| 7,603,711 B2 | 10/2009 | Scheidell |
| 7,609,862 B2 | 10/2009 | Black |
| 7,634,800 B2 | 12/2009 | Ide et al. |
| 7,650,502 B2 | 1/2010 | Sheymov |
| 7,657,938 B2 | 2/2010 | Palmer, Jr. et al. |
| 7,673,137 B2 | 3/2010 | Satterlee et al. |
| 7,680,062 B2 | 3/2010 | Kim et al. |
| 7,680,955 B2 | 3/2010 | Huang et al. |
| 7,690,033 B2 | 3/2010 | Pernia |
| 7,698,444 B2 | 4/2010 | Sheymov et al. |
| 7,702,508 B2 | 4/2010 | Bennett |
| 7,702,720 B1 | 4/2010 | Franke |
| 7,712,135 B2 | 5/2010 | Steinberg |
| 7,712,137 B2 | 5/2010 | Meier |
| 7,712,138 B2 | 5/2010 | Zobel et al. |
| 7,724,717 B2 | 5/2010 | Porras et al. |
| 7,725,558 B2 | 5/2010 | Dickenson |
| 7,735,091 B2 | 6/2010 | Aaron |
| 7,739,497 B1 | 6/2010 | Fink et al. |
| 7,756,933 B2 | 7/2010 | Reshef et al. |
| 7,770,225 B2 | 8/2010 | Hammond |
| 7,783,739 B1 | 8/2010 | Weigle |
| 7,809,791 B2 | 10/2010 | Schwartz et al. |
| 7,817,536 B2 | 10/2010 | Purpura |
| 7,818,788 B2 | 10/2010 | Meier |
| 7,818,799 B2 | 10/2010 | Chen et al. |
| 7,827,605 B2 | 11/2010 | Lyle et al. |
| 7,854,005 B2 | 12/2010 | Lyle et al. |
| 7,856,116 B2 | 12/2010 | Rodriguez et al. |
| 7,865,732 B2 | 1/2011 | Sheymov |
| 7,893,830 B2 | 2/2011 | Anand et al. |
| 7,894,357 B2 | 2/2011 | Purpura |
| 7,904,959 B2 | 3/2011 | Sidiroglou et al. |
| 7,913,303 B1 | 3/2011 | Rouland et al. |
| 7,921,459 B2 | 4/2011 | Houston et al. |
| 7,926,107 B2 | 4/2011 | Amoroso et al. |
| 7,929,542 B2 | 4/2011 | Purpura |
| 7,930,256 B2 | 4/2011 | Gonsalves et al. |
| 7,934,254 B2 | 4/2011 | Graham |
| 7,941,855 B2 | 5/2011 | Sung et al. |
| 7,961,917 B2 | 6/2011 | Black |
| 7,969,879 B2 | 6/2011 | Purpura |
| 8,001,595 B1 | 8/2011 | Spurlock et al. |
| 8,006,243 B2 | 8/2011 | Lum |
| 8,020,205 B2 | 9/2011 | Keeni |
| 8,037,530 B1 | 10/2011 | Fink et al. |
| 8,051,480 B2 | 11/2011 | Mahaffey |
| 8,060,756 B2 | 11/2011 | Rao et al. |
| 8,065,257 B2 | 11/2011 | Kuecuekyan |
| 8,065,725 B2 | 11/2011 | Zheng et al. |
| 8,087,067 B2 | 12/2011 | Mahaffey et al. |
| 8,091,093 B2 | 1/2012 | Huntsman |
| 8,103,435 B2 | 1/2012 | Yang et al. |
| 8,117,344 B2 | 2/2012 | Mendez et al. |
| 8,117,458 B2 | 2/2012 | Osborn, III et al. |
| 8,141,148 B2 | 3/2012 | Thomas et al. |
| 8,150,783 B2 | 4/2012 | Gonsalves et al. |
| 8,161,549 B2 | 4/2012 | Lahti et al. |
| 8,171,554 B2 | 5/2012 | Elovici et al. |
| 8,176,326 B2 | 5/2012 | Sheymov |
| 8,194,919 B2 | 6/2012 | Rodriguez et al. |
| 8,250,654 B1 | 8/2012 | Kennedy et al. |
| 8,255,439 B2 | 8/2012 | Prager et al. |
| 8,260,963 B2 | 9/2012 | Huang et al. |
| 8,266,320 B1 | 9/2012 | Bell et al. |
| 8,272,044 B2 | 9/2012 | Ansari et al. |
| 8,291,500 B1 | 10/2012 | Bojaxhi et al. |
| 8,301,789 B2 | 10/2012 | Morris et al. |
| 8,321,938 B2 | 11/2012 | Strayer et al. |
| 8,327,439 B2 | 12/2012 | Spurlock et al. |
| 8,335,678 B2 | 12/2012 | Hughes et al. |
| 8,335,931 B2 | 12/2012 | Lee et al. |
| 8,364,962 B2 | 1/2013 | Yao et al. |
| 8,384,542 B1 | 2/2013 | Merrill et al. |
| 8,392,991 B2 | 3/2013 | Ansari et al. |
| 8,392,999 B2 | 3/2013 | Adar |
| 8,407,785 B2 | 3/2013 | Sidiroglou et al. |
| 8,407,791 B2 | 3/2013 | Granstedt et al. |
| 8,413,216 B2 | 4/2013 | Hughes et al. |
| 8,429,751 B2 | 4/2013 | Mizrahi et al. |
| 8,443,442 B2 | 5/2013 | Wang et al. |
| 8,448,245 B2 | 5/2013 | Banerjee et al. |
| 8,453,246 B2 | 5/2013 | Lang et al. |
| 8,458,789 B1 | 6/2013 | Bartram |
| 8,464,334 B1 | 6/2013 | Singhal |
| 8,468,244 B2 | 6/2013 | Redlich et al. |
| 8,468,599 B2 | 6/2013 | McCusker et al. |
| 8,468,602 B2 | 6/2013 | McDougal et al. |
| 8,505,095 B2 | 8/2013 | Mahaffey |
| 8,505,099 B2 | 8/2013 | Chiang et al. |
| 8,516,596 B2 | 8/2013 | Sandoval et al. |
| 8,520,503 B2 | 8/2013 | Purpura |
| 8,521,667 B2 | 8/2013 | Zhu et al. |
| 8,528,091 B2 | 9/2013 | Bowen et al. |
| 8,532,970 B2 | 9/2013 | White et al. |
| 8,539,577 B1 | 9/2013 | Stewart et al. |
| 8,544,097 B2 | 9/2013 | Xiong |
| 8,549,285 B2 | 10/2013 | Fink et al. |
| 8,549,640 B2 | 10/2013 | Lyle et al. |
| 8,566,928 B2 | 10/2013 | Dagon et al. |
| 8,572,139 B2 | 10/2013 | Prager et al. |
| 8,572,735 B2 | 10/2013 | Ghosh et al. |
| 8,578,490 B2 | 11/2013 | Moran |
| 8,578,494 B1 | 11/2013 | Engler et al. |
| 8,578,497 B2 | 11/2013 | Antonakakis et al. |
| 8,578,499 B1 | 11/2013 | Zhu et al. |

(56) References Cited

U.S. PATENT DOCUMENTS

| | | |
|---|---|---|
| 8,584,236 B2 | 11/2013 | El-Moussa et al. |
| 8,595,846 B1 | 11/2013 | Etheredge et al. |
| 8,607,351 B1 | 12/2013 | Wang et al. |
| 8,621,578 B1 | 12/2013 | Blomquist et al. |
| 8,621,629 B2 | 12/2013 | Evans et al. |
| 8,631,489 B2 | 1/2014 | Antonakakis et al. |
| 8,640,238 B2 | 1/2014 | Brueckner et al. |
| 8,650,303 B1* | 2/2014 | Lang ..................... G06F 21/51 709/226 |
| 8,650,637 B2 | 2/2014 | Beresnevichiene et al. |
| 8,650,643 B2 | 2/2014 | Fink et al. |
| 8,671,224 B2 | 3/2014 | Bell et al. |
| 8,675,654 B2 | 3/2014 | Taft et al. |
| 8,677,481 B1 | 3/2014 | Lee |
| 8,677,489 B2 | 3/2014 | Strebe et al. |
| 8,677,490 B2 | 3/2014 | Yoo |
| 8,682,812 B1 | 3/2014 | Ranjan |
| 8,682,835 B1 | 3/2014 | Bickford |
| 8,686,923 B2 | 4/2014 | Eberl et al. |
| 8,688,619 B1 | 4/2014 | Ezick et al. |
| 8,695,091 B2 | 4/2014 | Komili et al. |
| 8,700,696 B2 | 4/2014 | Franke |
| 8,706,914 B2 | 4/2014 | Duchesneau |
| 8,706,915 B2 | 4/2014 | Duchesneau |
| 8,712,596 B2 | 4/2014 | Scott |
| 8,713,674 B1 | 4/2014 | Geide |
| 8,725,676 B1 | 5/2014 | Engler et al. |
| 8,725,677 B1 | 5/2014 | Engler et al. |
| 8,726,379 B1 | 5/2014 | Stiansen et al. |
| 8,726,393 B2 | 5/2014 | Macy et al. |
| 8,732,840 B2 | 5/2014 | Howes et al. |
| 8,744,894 B2 | 6/2014 | Christiansen et al. |
| 8,745,167 B2 | 6/2014 | Mendez et al. |
| 8,751,629 B2 | 6/2014 | White et al. |
| 8,755,522 B2 | 6/2014 | Stella et al. |
| 8,756,693 B2 | 6/2014 | Dube et al. |
| 8,763,126 B2* | 6/2014 | Wang ..................... G06F 21/00 713/1 |
| 8,874,896 B2* | 10/2014 | Boccon-Gibod ... G06F 21/6218 380/281 |
| 8,925,049 B2* | 12/2014 | Morrison ............ H04L 63/1433 726/1 |
| 8,995,658 B2 | 3/2015 | Heffner |
| 9,088,606 B2* | 7/2015 | Ranum ................ H04L 63/145 |
| 9,241,010 B1* | 1/2016 | Bennett ................ H04L 63/145 |
| 9,247,019 B2* | 1/2016 | Luna ..................... H04W 12/06 |
| 9,298,494 B2* | 3/2016 | Gathala .................. G06N 5/043 |
| 9,300,686 B2* | 3/2016 | Pidathala ............. H04L 63/145 |
| 9,306,974 B1* | 4/2016 | Aziz ...................... G06F 21/56 |
| 2012/0096539 A1* | 4/2012 | Hu ........................ G06F 21/552 726/13 |
| 2012/0124666 A1 | 5/2012 | Kim et al. |
| 2012/0151588 A1* | 6/2012 | Wang ..................... H04L 51/12 726/24 |
| 2014/0237599 A1 | 8/2014 | Gertner et al. |
| 2015/0215299 A1* | 7/2015 | Burch .................... H04L 63/08 726/5 |
| 2015/0373023 A1* | 12/2015 | Walker ................... H04L 63/10 726/3 |

OTHER PUBLICATIONS

"Extended European Search Report for EP Application No. 15199042.1, Reference No. 1284P898EP_ML from the European Patent Office dated Aug. 3, 2016", Extended European Search Report for EP Application No. 15199042.1, Reference No. 1284P898EP_ML from the European Patent Office dated Mar. 8, 2016, 7 pages.

* cited by examiner

COMPUTER DEFENSES AND COUNTERATTACKS

FIELD OF THE DISCLOSURE

The present disclosure relates to systems and methods to defend computers and networks, as well as to conduct counterattacks.

BACKGROUND

Computer and network security typically focuses on defending a computer or a system of computers against attacks. New types of attacks are regularly developed. Accordingly, computer and network security providers frequently update monitoring software and other software to keep pace with the new types of attacks.

As a result of conventional methods of updating software after detection and analysis of a new type of attack, computer systems and networks are vulnerable for a period of time after the development of each new type of attack. Taking steps to reduce response times to new attack types may reduce vulnerability of computer systems and networks to attacks.

SUMMARY

In a particular embodiment, a system includes a processing system having one or more processors and memory accessible to the processing system. The memory stores instructions executable by at least one processor of the one or more processors to cause the at least one processor to perform operations including instantiating a first detection agent based on detection criteria. The first detection agent includes first program code executable by a second processor to monitor network activity. The operations also include sending the first program code of the first detection agent to a remote computing device for execution. When the first program code of the first detection agent is executed at the remote computing device, the first detection agent causes network activity data to be transmitted to the processing system, and the processing system updates the detection criteria based on the network activity data to generate updated detection criteria. The operations further include instantiating a second detection agent based on the updated detection criteria and sending second program code of the second detection agent to the remote computing device for execution.

In another particular embodiment, a method includes instantiating a first detection agent based on detection criteria, the first detection agent including first program code executable by a second computing device to monitor network activity. The method also includes sending the first program code of the first detection agent to the second computing device for execution. When the first program code of the first detection agent is executed at the second computing device, the first detection agent causes network activity data to be transmitted to a network monitor, and the network monitor updates the detection criteria based on the network activity data to generate updated detection criteria. The method also includes instantiating a second detection agent based on the updated detection criteria and sending second program code of the second detection agent to the second computing device for execution.

In another particular embodiment, a computer-readable storage device stores instructions that are executable by a processor to cause the processor to perform operations including instantiating a first detection agent based on detection criteria. The first detection agent includes first program code executable by a remote computing device to monitor network activity. The operations further include sending the first program code of the first detection agent to the remote computing device for execution. When the first program code of the first detection agent is executed at the remote computing device, the first detection agent causes network activity data to be transmitted to a network monitor, and the network monitor updates the detection criteria based on the network activity data to generate updated detection criteria. The operations also include instantiating a second detection agent based on the updated detection criteria and sending second program code of the second detection agent to the remote computing device for execution.

The features, functions, and advantages that have been described can be achieved independently in various embodiments or may be combined in yet other embodiments, further details of which are disclosed with reference to the following description and drawings.

DETAILED DESCRIPTION

Figure 1:
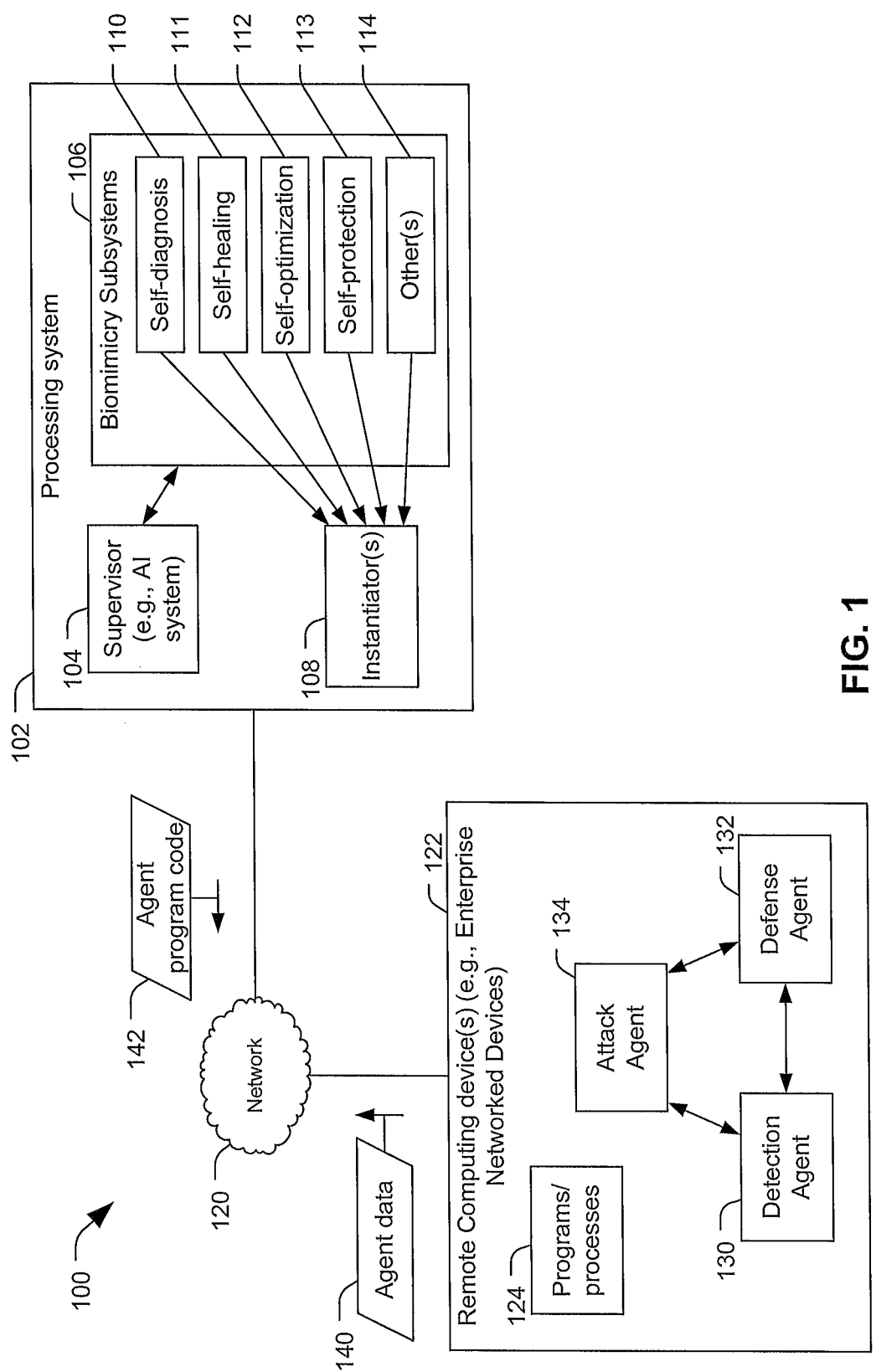
FIG. 1 is a diagram that illustrates a first particular embodiment of a computer defense and counterattack system.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Embodiments described herein enable decentralized monitoring of and responding to network threats, which may improve response times to particular types of attacks. For example, a cyber defense system may utilize agents (executing at a plurality of computing devices) to autonomously gather information, perform defensive actions, perform offensive actions (e.g., counterattacks), or a combination thereof. Detection agents may gather information from many computing devices, such as computing devices coupled to an enterprise network (e.g., client computers, routers, servers, control systems, etc.) and computing devices remote from the enterprise network (e.g., a computer suspected of threatening activity, etc.). Detection agents may send the information to other agents associated with the cyber defense system, to a controller (or supervisor) of the cyber defense system, or both. The controller may be a centralized or decentralized (e.g., distributed) system that analyzes the information and causes actions to be taken at one or more network devices. For example, the controller may be an artificial intelligence system that analyzes the information to detect potential threats and coordinates response actions at the enterprise network. Other agents associated with the cyber defense system may include other detection agents, attack agents, or defense agents.

Detection agents gather and report network activity data based on detection criteria. For example, a detection agent may execute at a computing device to gather information descriptive of processes executing at the computing device, to gather information descriptive of network communications from the perspective of the computing device, etc. Defense agents perform actions to reduce or mitigate a perceived threat. For example, a defense agent may execute at a computing device to perform a defense action (such as to close a network connection, to terminate an executing process, etc.). Attack agents perform offensive actions directed to a perceived source of a threat. For example, an attack agent executing at a computing device may perform actions such as causing a network connection of another device to be terminated or overwhelmed (e.g., a denial of service attack), to take over control of the other device, etc.

After deployment, a set of agents (e.g., detection agents, defense agents, and/or attack agents) may cooperate with one another independently of the cyber defense system. For example, a set of agents deployed by the cyber defense system may detect threats and take offensive or defensive action related to detected threats without input from the cyber defense system. The agents may provide information to the cyber defense system, such as descriptions of detected or suspicious network activity, response actions taken, results of response actions, etc. The information provided to the cyber defense system may enable the cyber defense system to generate (e.g., instantiate or compile) new agents that are better capable of detecting or dealing with a particular threat, to send agents to new or different computing systems, or to otherwise improve protection of a network associated with the cyber defense system.

The controller may remotely control, disable or replace the agents as needed. For example, in response to information received from a detection agent that indicates existence of a new type of attack, the controller may cause one or more new agents (e.g., new detection agents, new defense agents, new attack agents, or a combination thereof), to be instantiated and sent to a remote computing device for execution to replace or to supplement agents already executing at the remote computing device ("old agents"). When the new agents replace the old agents, the controller may cause the old agents to be deactivated. The new agents may be configured to respond to the new type of attack (e.g., may include program code that is executable to perform actions to mitigate the new type of attack). Alternately, the controller may send a signal that causes one or more agents that are already deployed (e.g., old agents) to activate to address the new type of attack if the controller determines that the old agents are capable of responding to the new type of attack. Thus, the cyber defense system enables fast and tailored response to new threats.

FIG. 1 illustrates a first particular embodiment of a computer defense and counterattack system 100. The system 100 includes a processing system 102 of a cyber defense system. The processing system 102 may include one or more computing devices or processors. For example, the processing system 102 may include a single computing device, such as a server device, or may be a distributed system including multiple computing devices. The processing system 102 may be coupled via a network 120 to one or more remote computing devices 122. For example, the remote computing devices 122 may include one or more devices of an enterprise network that is protected by the processing system 102, one or more computing devices associated with suspicious activity (e.g., a perceived threat), other computing devices, or a combination thereof. The remote computing devices 122 may include client computing devices (e.g., an end user device or a work station) or other types of computing devices (e.g., routers, switches, servers, control systems, or other computing devices).

The processing system 102 may include a plurality of subsystems, which are depicted as distinct functional blocks in FIG. 1. For example, the subsystems may include a supervisor application 104 (e.g., a controller), a biomimicry subsystem 106 and/or instantiators 108. Representation of the subsystems as functional blocks in FIG. 1 is intended to simplify description of different actions associated with or performed by the subsystems and is not meant to imply that distinct software or hardware is associated with each functional block. To illustrate, functions described as performed by the supervisor application 104 may be executed by a first computing device, functions described as performed by the biomimicry subsystems 106 may be executed at a second computing device, and functions described as performed by the instantiators 108 may be executed at a third computing device. Alternatively, the functions performed by the supervisor application 104, functions performed by the biomimicry subsystems 106, and functions performed by the instantiators 108 may be executed at a single computing device. Other combinations are also possible, such as execution of the functions performed by the supervisor application 104 and the instantiators 108 at a first computer and execution of the functions performed by the biomimicry subsystems 106 at a second computer. Further, any or all of the functional blocks may be executed in whole or in part at multiple computing devices. To illustrate, functions performed by the supervisor application 104 may be executed at multiple computing devices such that each of the multiple computing devices independently performs all of the functions or such that each of the multiple computing devices performs a subset of the functions.

In a particular embodiment, the supervisor application 104 may include an artificial intelligence (AI) system that is adapted to process information to assess network security, to make determinations regarding options for responding to network security issues, to provide an interface to users (such as network security administrators), or a combination thereof. The biomimicry subsystems 106 may include subsystems that provide specific functionality to the network to sustain or improve operation of the network. For example, the biomimicry subsystems 106 may include a self-diagnosis subsystem 110 that is adapted to identify and diagnose (e.g., identify potential causes of) network performance concerns, such as connectivity issues (e.g., loss of a communication connection), reduced data rates, etc. As another example, the biomimicry subsystems 106 may include a self-healing system 111 that is adapted to perform actions to attempt to repair network performance concerns detected by the self-diagnosis subsystem 110. To illustrate, the self-healing system 111 may attempt to re-establish a lost data connection or attempt to reroute data to avoid the lost data connection. As another example, the biomimicry subsystems 106 may include a self-optimization subsystem 112 adapted to perform optimization operations, such as load balancing, to improve operation of the network or operation of specific subsystems of the network. As yet another example, the biomimicry subsystems 106 may include a self-protection subsystem 113. The self-protection subsystem 113 may be adapted to perform computer monitoring, defense actions, and attack actions as described herein. The biomimicry subsystems 106 are not limited to the specific subsystems described above. Rather, the biomimicry subsystems 106 may include other subsystems 114 in addition to or instead of the subsystems 110-113 described above.

The instantiators 108 are adapted to generate (e.g., instantiate or compile) executable code based on parameters or instructions provided by various subsystems of the biomimicry subsystems 106. To illustrate, the self-optimization subsystem 112 may provide parameters or instructions to the instantiators 108 to generate code that is executable at a remote computing device, such as the remote computing device 122, to optimize (or improve in some respect) performance of the remote computing device or performance of the network 120. As a specific example, the performance may be improved by changing a quality of service parameter associated with particular network communications to or from the remote computing device 122. In another example, the instantiators 108 may be adapted to generate executable code of various cyber security agents at the direction of, or based on, parameters or criteria provided by the self-protection subsystem 113. The cyber security agents may include detection agents 130, attack agents 134, defense agents 132 or a combination thereof. The program code generated by the instantiators 108 may be executable on a particular platform (e.g., an operating system of a particular remote computing device) or may be cross-platform compatible.

Agents generated by the instantiators 108 may be sent as agent program code 142 via the network 120 to remote computing devices, such as the remote computing devices 122. The remote computing devices 122 may execute the agent program code 142 to perform actions based on the agent program code 142. To illustrate, when the agent program code 142 corresponds to a detection agent 130, the remote computing device 122 may execute the detection agent 130 to monitor network activities, to monitor activities or processes implemented by one or more programs or processes 124 executing on the remote computing device 122, or to perform other monitoring actions based on detection criteria specified by the agent program code 142 of the detection agent 130. The detection agent 130 may generate data, such as agent data 140, which may be transmitted from the remote computing device 122 via the network 120 to the processing system 102. The supervisor application 104 may analyze the agent data 140 and may take one more actions based on the agent data 140. For example, the supervisor application 104 may provide instructions to the biomimicry subsystems 106 to utilize one or more of the biomimicry subsystems 106 to generate additional agents, to generate different types of agents, or to provide agents to different computing devices (e.g., other remote computing device).

In another example, when the agent program code 142 corresponds to an attack agent 134, the remote computing device 122 may execute the agent program code 142 to perform one or more counterattack actions specified by the agent program code 142 of the attack agent 134. To illustrate, the attack agent 134 may receive information from the detection agent 130 and may perform a counterattack action based on the information received from the detection agent 130.

In a particular embodiment, the detection agent 130 may provide information to the attack agent 134 independently of the processing system 102. For example, a detection agent executing at a particular remote computing device (such as the detection agent 130 executing at the remote computing device 122) may provide information via encrypted communications directly to an attack agent (such as the attack agent 134) executing at the same remote computing device or executing at a different remote computing device. The attack agent 134 may perform a counterattack action without awaiting an instruction from the supervisor application 104 or other components of the processing system 102.

As another example, when the agent program code 142 corresponds with a defense agent 132, the remote computing device 122 may execute the agent program code 142 to perform one or more defense actions specified by the agent program code 142 of the defense agent 132. To illustrate, the defense agent 132 may perform defense actions responsive to information received from a detection agent executing at a particular remote computing device (such as the detection agent 130 executing at the remote computing device 122). To illustrate, the detection agent 130 may detect suspicious activity and provide a communication via an encrypted message to the defense agent 132. The defense agent 132 may take a defense action, such as terminating a process executing at the remote computing device 122, based on the encrypted message.

Defense agents and attack agents (such as the defense agent 132 and the attack agent 134) may also interact with one another to coordinate activities independently of the processing system 102. To illustrate, the defense agent 132 may provide a secure communication to the attack agent 134 indicating that the defense agent 132 has or will perform a particular defense action. The attack agent 134 may perform a counterattack action responsive to the communication. Similarly, the detection agent 130 may take actions based on information provided by the attack agent 134, the defense agent 132, or both. To illustrate, the detection agent 130 may monitor particular network activities or particular programs or processes 124 based on secure communications (from the attack agent 134, the defense agent 132, or both) that particular actions have been performed or will be performed by the corresponding agents. Thus, each agent 130-134 executing at the remote computing device 122 may take action independently of the processing system 102 and/or in coordination with other agents at the remote computing device 122 to provide cyber security to the network 120.

In operation, the supervisor application 104 may cause the self-protection subsystem 113 to instruct the instantiators 108 to instantiate (e.g., compile) a detection agent based on particular detection criteria. In a particular embodiment, the detection criteria may specify, for example, particular types of network activity to be monitored, particular circumstances under which information is to be to provided to other agents or to the processing system 102, types of information to be reported, timing of gathering or reporting information, or combinations thereof. The detection agent may be instantiated as program code that is executable by a processor to monitor network activity. For example, the detection agent 130 may correspond to or include the agent program code 142.

The processing system 102 may send the agent program code 142 to a remote computing device, such as the remote computing device 122, for execution. When the agent program code 142 corresponding to the detection agent 130 is executed at the remote computing device 122, the detection agent 130 gathers information, such as network activity data, and transmits the information, e.g., as the agent data 140, to the processing system 102, to other agents (e.g., the defense agent 132 or the attack agent 134), or both. The processing system 102 may take actions based on the agent data 140. For example, the supervisor application 104 may analyze the agent data 140 to determine updated detection criteria. The updated detection criteria may be provided to the self-protection subsystem 113 which may cause the instantiators 108 to generate an updated detection agent which may be transmitted, as agent program code 142, to the remote computing device 122 or to another remote computing device for execution. When executed, the updated detection agent may supplement the detection agent 130 or may replace the detection agent 130. The detection agent 130 may be adapted to detect network activity based on a first network detection criterion, and the updated detection agent may be adapted to detect network activity based on a second detection criteria that is distinct from the first detection criteria. For example, the detection agent 130 may detect network activity associated with a connection to the network 120, and the updated detection agent may detect network activity associated with a specific program or process of the programs or processes 124 executing at the remote computing device 122.

In a particular embodiment, the supervisor application 104 may perform an analysis of the agent data 140 and may initiate one or more actions automatically, i.e., without human intervention, based on the analysis. Additionally, the supervisor application 104 may notify a human operator of the agent data 140, of results of analysis of the agent data 140, of actions automatically performed based on the agent data 140 or the results of the analysis, or a combination thereof.

Additionally or in the alternative, during operation, the processing system 102 may cause a defense agent to be instantiated. For example, the supervisor application 104 may instruct the self-protection subsystem 113 to generate one or more defense agents. The self-protection subsystem 113 may provide instructions and/or criteria to the instantiators 108 to cause the instantiators 108 to generate one or more defense agents. A particular defense agent may be sent, as the agent program code 142, via the network 120 to the remote computing device 122 for execution as the defense agent 132. When the defense agent 132 is executed at the remote computing device 122, the defense agent 132 may perform mitigation activities and may cause network activity mitigation data to be transmitted, as agent data 140, to the processing system 102 or to other agents. The network activity mitigation data may indicate actions taken by the defense agent 132, suspicious activity that triggered the defense actions, responses to the defense actions, or any combination thereof.

Additionally or in the alternative, during operation, the processing system 102 may cause one or more attack agents to be instantiated. For example, the supervisor application 104 may instruct the self-protection subsystem 113 to cause one or more attack agents to be instantiated by the instantiators 108 based on particular criteria. A particular attack agent may be transmitted, as agent program code 142, via the network 120 to a remote computing device, such as remote computing device 122, for execution. The attack agent 134, when executed by the remote computing device 122, may automatically perform offensive actions, such as a counterattack. The particular actions that are performed by the attack agent 134 may be specified by the agent program code 142 corresponding to the attack agent 134. Additionally, the attack agent 134 may cause counterattack activity data to be transmitted, as agent data 140, to the processing system 102 or to other agents. The counterattack activity data may indicate actions taken by the attack agent 134, activity that triggered the actions, responses to the actions, or any combination thereof.

In a particular embodiment, the supervisor application 104 may cause the self-protection subsystem 113 to have instantiated an updated (or new) agent based on the agent data 140 received from an agent executing at a remote computing device (such as one of the agents 130-134 executing at the remote computing device 122). The updated (or new) agent may be instantiated to have functionality or capabilities different from or in addition to the agent that provided the agent data 140. For example, the agent data 140 may be received from a detection agent, such as the detection agent 130, and the updated (or new) agent may include a defense agent, an attack agent, or a detection agent with different or additional detection criteria. As another example, the agent data 140 may be received from a defense agent, such as the defense agent 132, and the updated (or new) agent may include a detection agent, an attack agent, or a defense agent capable of performing different defense actions or performing defense actions in a different manner or in response to different criteria than the defense agent that sent the agent data 140. As yet another example, the agent data 140 may be received from an attack agent, such as the attack agent 134, and the updated (or new) agent may include a detection agent, a defense agent, or an attack agent capable of performing different counterattack actions or performing counterattack actions in a different manner or in response to different criteria than the attack agent that sent the agent data 140. Further, more than one update (or new) agent may be generated based on the agent data 140.

As a specific example, when the agent data 140 is received at the processing system 102, the supervisor application 104 may analyze the agent data 140 and determine appropriate counterattack measures or counterattack processes to be implemented by an attack agent based on the agent data 140. The supervisor application 104 may provide information indicating the particular counterattacks or the particular threat that triggered instantiation of the attack agent to the self-protection subsystem 113. The self-protection subsystem 113 may cause one or more attack agents to be instantiated by the instantiators 108 and transmitted as agent program code 142 to the remote computing device 122 or another remote computing device.

While executing at the remote computing device, various agents, such as the detection agent 130, the defense agent 132, and the attack agent 134 may act independently of the processing system 102 to coordinate activities, such as detection activities, counterattack activities and defense activities. Additionally, the agents 130-134 may share information with one another via secure communications and may provide agent data 140 to the processing system 102. Information provided to the supervisor application 104 may enable the supervisor application 104 to analyze actions performed by the agents, to analyze data detected by the agents, to update operation of the agents (e.g., by instantiating and distributing new agents), or to modify operation of the agents (e.g., by sending secure messages to the agents to cause the agents to cease operation or to transition from a dormant state to an active state). For example, the processing system 102 may cause the agents 130-134 to be instantiated with a shared encryption key that enables the agents 130-134 to share secured communications with one another or with the processing system 102.

Accordingly, the agents 130-134 may operate in a "fire and forget" manner (e.g., may perform actions autonomously or in coordination with one another) to provide cyber security for a network associated with the processing system 102. The agents 130-134 may be configured to infiltrate other systems (e.g., the remote computing device 122) to monitor, degrade, destroy and/or control the other systems. In a particular embodiment, one or more of the agents 130-134 may hibernate or await execution until particular circumstances are present (such as arrival of a particular time or date, receipt of a wake up signal, execution of a particular program or process, etc.). For example, the attack agent 134 may execute responsive to detection of particular network activities by the detection agent 130. Thus, one or more of the agents 130-134 may cause execution of another agent responsive to actions detected at the remote computing device independently of the processing system 102. While hibernating or while executing, the agents 130-134 may emulate trusted components of the remote computing device 122 to avoid detection (e.g., by the remote computing device 122 or by other cyber defense systems). An example of emulating a trusted component is for one or more of the agents 130-134 to mirror a normal operational rhythm of a trusted device by monitoring the typical operational signature (e.g., rhythm) of the trust device before the agent commences active operation based on the signature (or rhythm).

Figure 2:
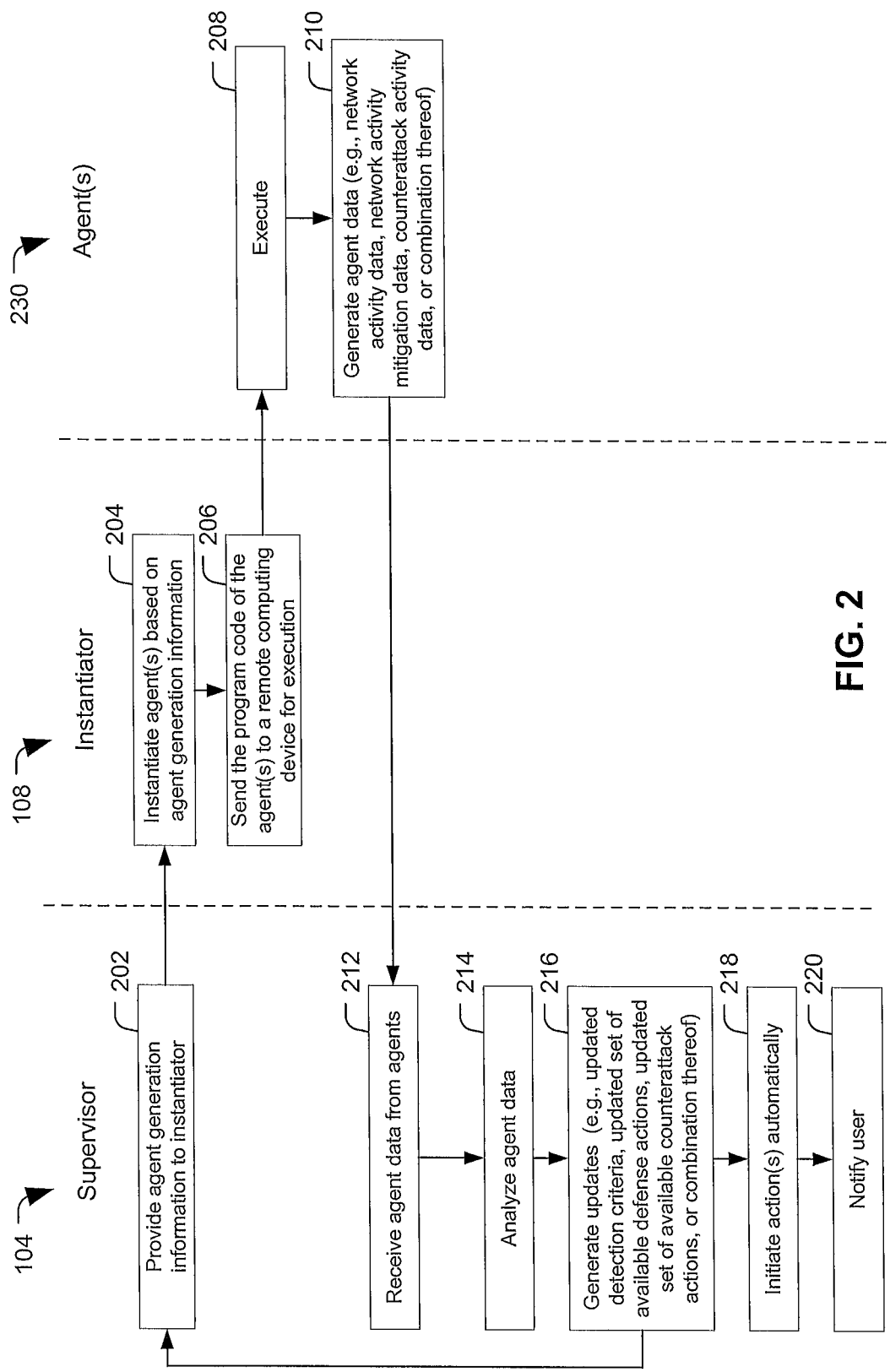
FIG. 2 is a diagram that illustrates a method of computer defense that may be performed by the system of FIG. 1.

FIG. 2 illustrates a particular embodiment of a method that may be performed by the system 100 of FIG. 1. FIG. 2 illustrates the supervisor application 104, the instantiators 108 and one or more agents 230. The one or more agents 230 may include detection agents, defense agents, attack agent, or a combination thereof. In a particular embodiment, the supervisor application 104 may provide agent generation information via one or more biomimicry subsystems 106 to the instantiators 108, at 202. The instantiators 108 may generate agent program code based on the agent generation, at 204. The instantiators 108 may send the agent program code to a remote computing device for execution, at 206. At 208, the one or more agents 230 may be executed at the remote computing device. While executing, the one or more agents 230 may generate agent data, such as network activity data, network activity mitigation data, or counterattack data, at 210. The agent data may be sent to other agents, to the supervisor application 104, or both.

The supervisor application 104 may receive the agent data from the one or more agents, at 212. The supervisor application 104 may analyze the agent data, at 214, and may generate updates to agent generation information, at 216. For example, the updates may include updated detection criteria, an updated set of defense actions, an updated set of available counterattack actions, or combination thereof. Additionally or in the alternative, the supervisor application 104 may initiate one or more actions automatically, at 218. For example, the supervisor application 104 may perform actions at a local computing device, such as one or more processing devices of the processing system 102 of FIG. 1. To illustrate, the supervisor application 104 may change settings or other programs or processes executing at the computing device. The supervisor application 104 may also, or in the alternative, notify a user, at 220. For example, the supervisor application 104 may notify a network security administrator of information received via the agent data, results of analysis of the agent data, actions automatically performed by the supervisor application 104, or a combination thereof. After generating updates, at 216, the supervisor application 104 may provide updated agent data to the instantiators 108, at 202. Thus, the supervisor application 104, the instantiators 108 and the one or more agents 230 may collaborate and take actions independently to provide network security to an enterprise network.

Figure 3:
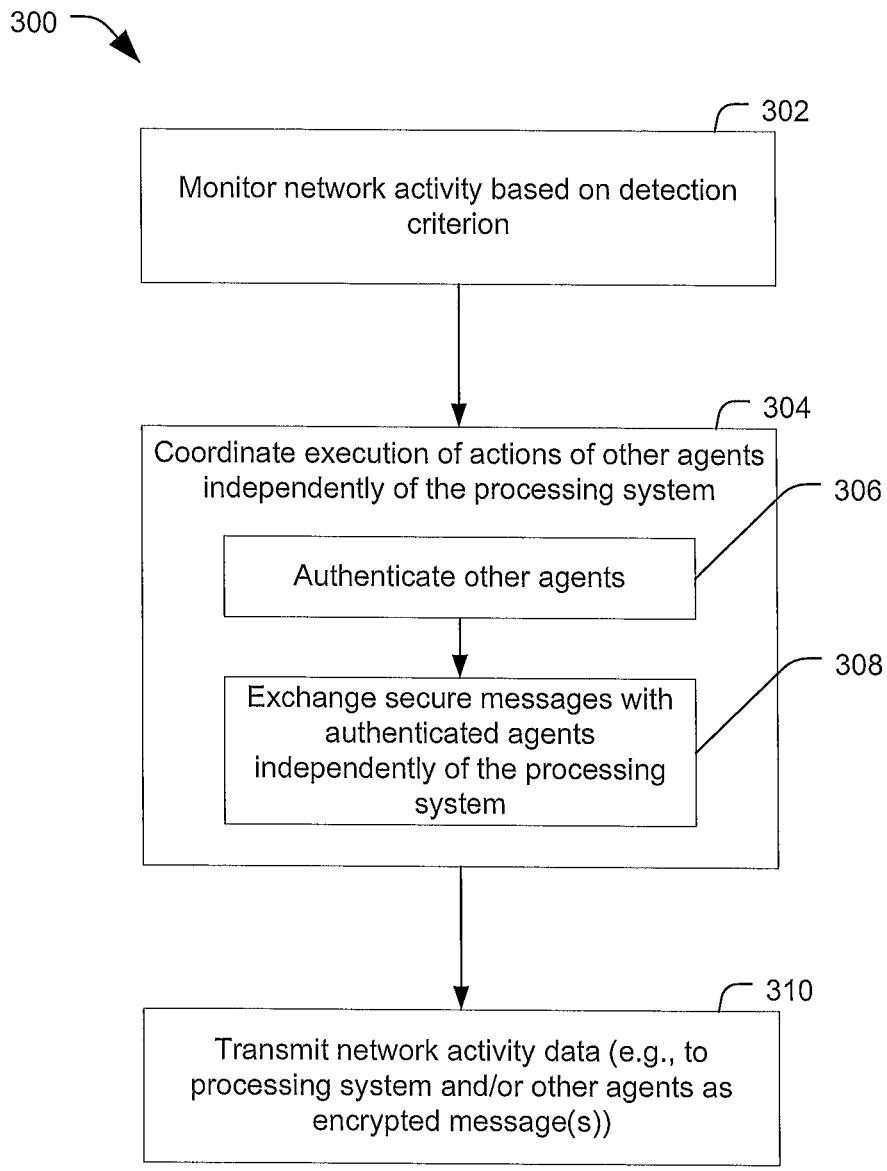
FIG. 3 is a flow chart of a first particular embodiment of a method associated with a computing agent

FIG. 3 is a flow chart of a particular embodiment of a method 300 that may be performed by a detection agent executing at a computing device, such as the remote computing device 122. The method 300 includes monitoring network activity based on detection criteria, at 302. For example, the detection agent 130 executing at the remote computing device 122 of FIG. 1 may monitor particular activity or actions on a network (such as the network 120), particular processes or programs executing at the remote computing device 122 (such as the programs and processes 124), or other activities based on detection criteria specified by the agent program code 142 of the detection agent 130.

The method 300 also includes, at 304, coordinating execution of actions with other agents independently of the processing system. For example, the detection agent may authenticate other agents, at 306, via secure communication and may exchange secure messages with authenticated agents independently of the processing systems, at 308. The secure messages may be used by the detection agent and the other agents to coordinate activities and to provide information to the processing system. For example, the agents 130-134 of FIG. 1 may include authentication information that may be used to exchange authentication information between the agents 130-134. The agents 130-134 may include encryption information (such as shared key or public key/private key data) that may be used to send secure (e.g., encrypted) information between the agents 130-134, or to the processing system 102.

The method 300 also includes, at 310, transmitting network activity data via encrypted messages to the processing system, to other agents, or both. Thus, the process flow illustrated in FIG. 3 may enable a detection agent executing at a remote computing device to detect suspicious activity based on detection criteria and to notify the processing system and/or other agents to the suspicious activity. The processing system may use the network activity data to generate a new agent (e.g., a new detection agent, a new defense agent, or a new attack agent) based on updated criteria (e.g., new detection criteria, a new set of available defense actions, a new set of available attack actions, or new criteria for executing or selecting particular available actions). The new agent may be provided to the remote computing device or to another computing device for execution. Additionally or in the alternative, other agents may use information provided by the defense agent to select and/or execute particular response actions, such as counterattack actions or defense actions.

Figure 4:
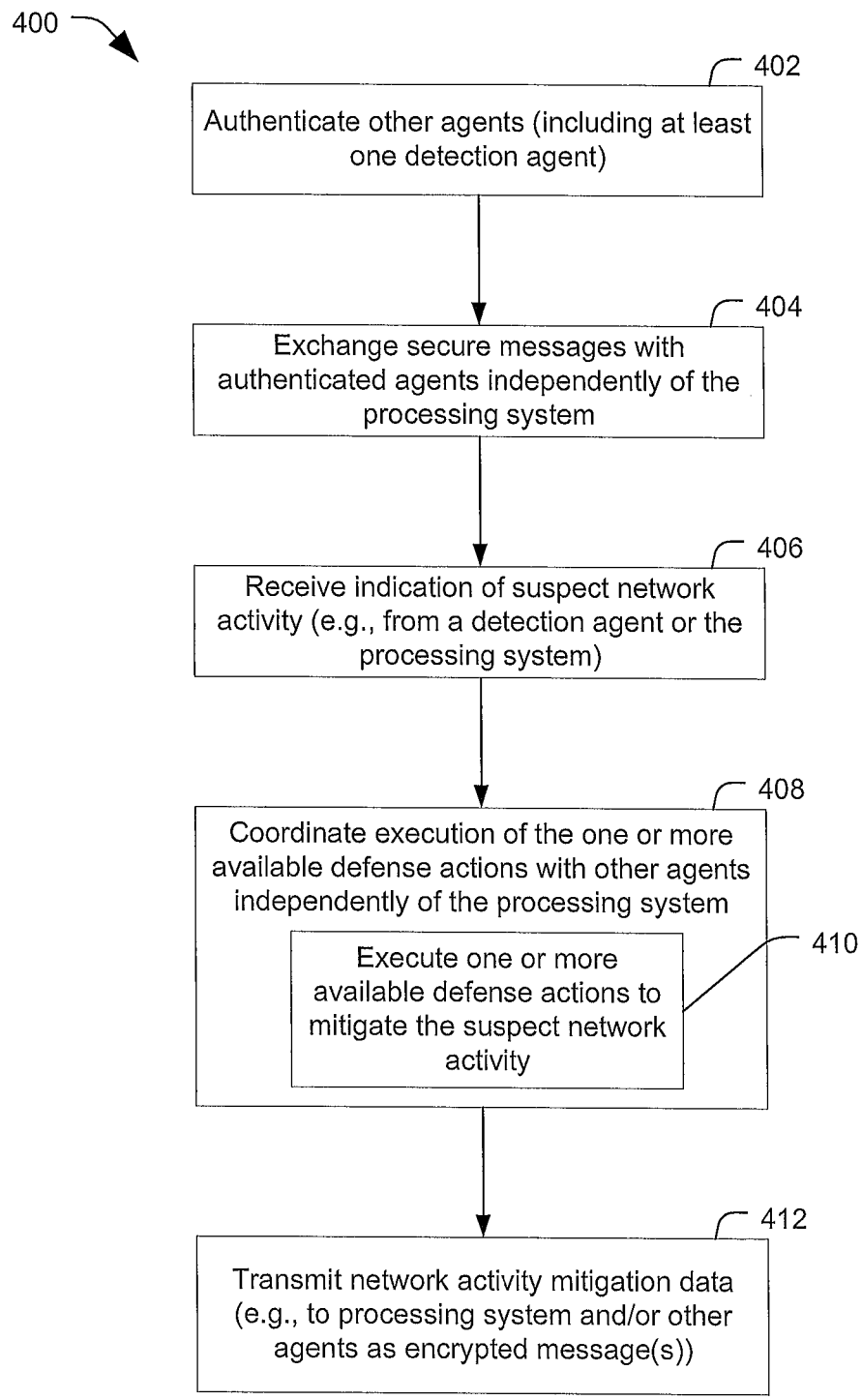
FIG. 4 is a flow chart of a second particular embodiment of a method associated with a computing agent

FIG. 4 is a flow chart of a particular embodiment of a method 400 that may be performed by a defense agent executing at a computing device, such as the defense agent 132 executing at the remote computing device 122 of FIG. 1. The method 400 may include, at 402, authenticating one or more agents, such as one or more detection agents executing at the same remote computing system as the defense agent or executing at another computing system. For example, the defense agent 132 of FIG. 1 may authenticate other agents (e.g., the agents 130 and 134) via secure communication and may exchange secure messages with authenticated agents independently of the processing systems 102. The secure messages may be used by the defense agent 132 and the other agents 130 and 134 to coordinate activities and to provide information to the processing system 102. To illustrate, as explained above, the agents 130-134 of FIG. 1 may include authentication information that may be used to exchange authentication information between the agents 130-134. The agents 130-134 may include encryption information (such as shared key or public key/private key data) that may be used to send secure (e.g., encrypted) information between the agents 130-134, or to the processing system 102.

The method 400 may also include, at 404, exchanging secure messages with one or more authenticated agents independently of the processing system. For example, two or more agents executing at the same remote computing system may exchange secure messages at the remote computing system without transmitting messages via a network, such as the network 120 of FIG. 1. As another example, an agent executing at a first remote computing system may provide information to an agent executing at a second remote computing system via a secure message without providing the information to the processing system or via a broadcast sent to both the processing system and the other agent.

The method 400 also includes, at 406, receiving an indication of suspect network activity. For example, the detection agent 130 or the processing system 102 may provide information to the defense agent 132. The information may indicate suspect network activity based on detection criteria, the information may direct the defense agent 132 to perform particular defensive actions, or both.

The method 400 also includes, at 408, coordination of one or more available defense actions with other agents independent of the processing system. For example, the defense agent 132 may coordinate selection or execution of a particular defense action with selection or execution of another defense action by another defense agent (not shown) executing at the remote computing device 122 or executing at another computing device. The defense action may be selected from a set of available defense actions that include actions that the defense agent 132 is capable of performing based on agent program code 142 of the defense agent 132. As another example, the defense agent 132 may coordinate selection or execution of a particular defense action with selection or execution of a particular counterattack action by the attack agent 134. As yet another example, the defense agent 132 may coordinate selection or execution of a particular defense action with the detection agent 130. To illustrate, the detection agent 130 may send a secure message to the defense agent 132 that triggers selection and/or execution of the particular defense action by the defense agent 132.

The method 400 also includes, at 410, executing the one or more available defense actions to mitigate the suspect network activity. For example, the defense agent 132 may execute a defense action to block a network connection, to reroute data, to isolate (e.g., sandbox) a program or process, etc.

The method 400 may also include, at 412, transmitting network activity mitigation data to the processing system, to other agents, or to both, as encrypted messages. For example, before, during or after execution of a particular defense action, the defense agent 132 may provide information to the processing system 102 or to the other agents 130 and 134 identifying the particular action to be performed, indicating a response to the particular action, or providing other information related to the particular action.

Thus, the process flow illustrated in FIG. 4 may enable a defense agent executing at a remote computing device to autonomously perform one or more defense actions of a set of available defense action and to notify the processing system and/or other agents of actions taken or results of such actions. The processing system may use the information received from the defense agent to generate new or updated agent criteria, which may be used to instantiate a new agent (e.g., a new detection agent, a new defense agent or a new attack agent) based on updated criteria (e.g., new detection criteria, a new set of available defense actions, a new set of available attack actions, or new criteria for executing or selecting particular available actions). The new agent may be provided to the remote computing device or to another computing device for execution. Additionally or in the alternative, other agents may use the information provided by the defense agent to select and/or execute other response actions, such as counterattack actions.

Figure 5:
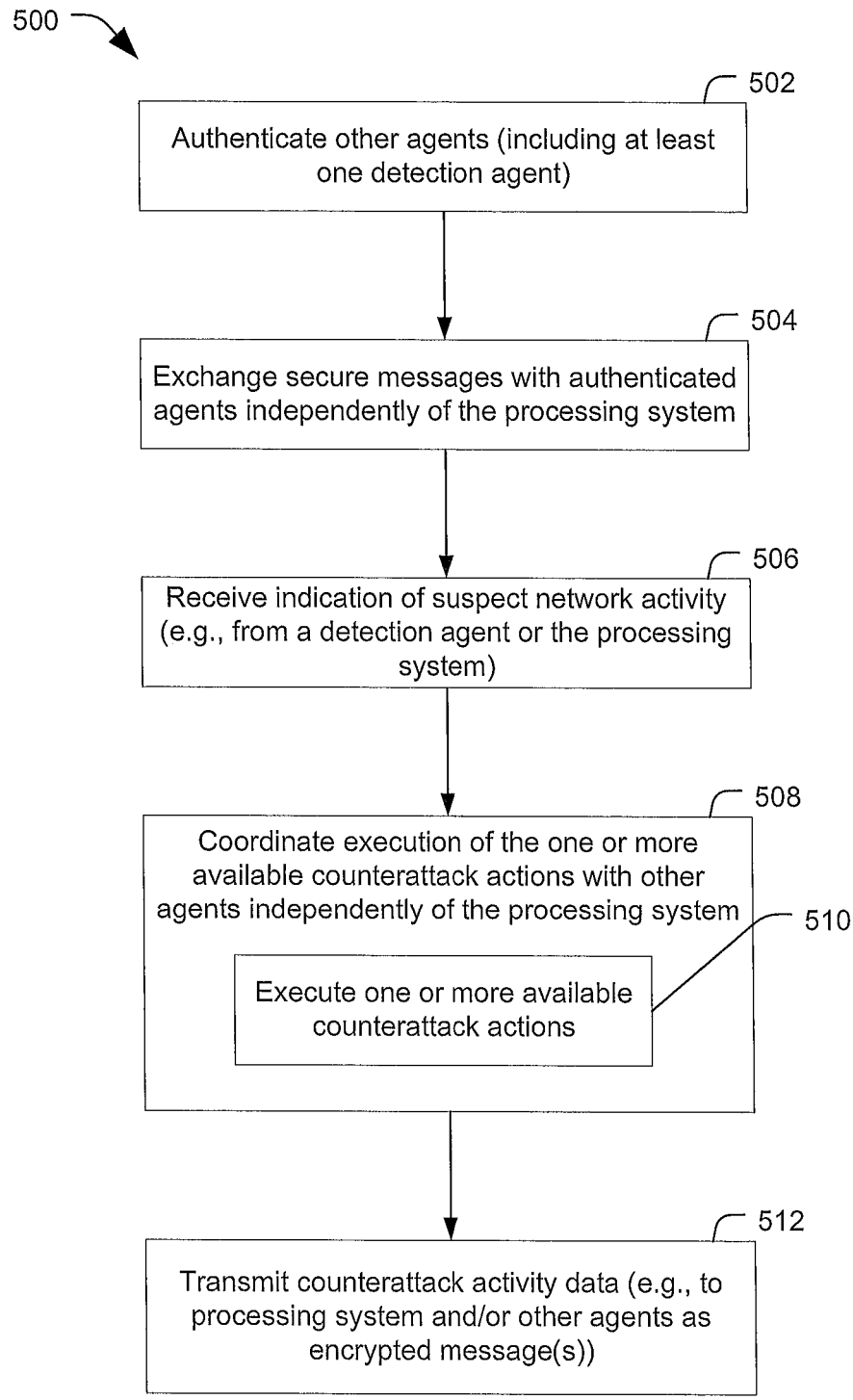
FIG. 5 is a flow chart of a third particular embodiment of a method associated with a computing agent.

FIG. 5 is a flow chart of a particular embodiment of a method 500 that may be performed by an attack agent executing at a computing device, such as the attack agent 134 executing at the remote computing device 122 of FIG. 1. The method 500 may include, at 502, authenticating one or more agents, such as one or more detection agents executing at the same remote computing system as the defense agent or executing at another computing system. For example, the attack agent 134 of FIG. 1 may authenticate other agents (e.g., the agents 130 and 132) via secure communication and may exchange secure messages with authenticated agents independently of the processing systems 102. The secure messages may be used by the attack agent 134 and the other agents 130 and 132 to coordinate activities and to provide information to the processing system 102. To illustrate, as explained above, the agents 130-134 of FIG. 1 may include authentication information that may be used to exchange authentication information between the agents 130-134. The agents 130-134 may include encryption information (such as shared key or public key/private key data), which may be used to send secure (e.g., encrypted) information between the agents 130-134, or to the processing system 102.

The method 500 may also include, at 504, exchanging secure messages with one or more authenticated agents independently of the process system. For example, two or more agents executing at the same remote computing system may exchange secure messages at the remote computing system without transmitting messages via a network, such as the network 120 of FIG. 1. As another example, an agent executing at a first remote computing system may provide information to an agent executing at a second remote computing system via a secure message without providing the information to the processing system or via a broadcast sent to both the processing system the other agent.

The method 500 also includes, at 506, receiving an indication of suspect network activity. For example, the detection agent 130 or the processing system 102 may provide information to the attack agent 134. The information may indicate suspect network activity based on detection criteria, may direct the attack agent 134 to perform particular defensive actions, or both.

The method 500 also includes, at 508, coordination of one or more available counterattack actions with other agents independent of the processing system. For example, the attack agent 134 may coordinate selection or execution of a particular counterattack action with selection or execution of another counterattack action by another attack agent (not shown) executing at the remote computing device 122 or executing at another computing device. The available counterattack actions may include actions that the attack agent 134 is capable of performing based on agent program code 142 of the attack agent 134. As another example, the attack agent 134 may coordinate selection or execution of a particular counterattack action with selection or execution of a particular defense action by the defense agent 132. As yet another example, the attack agent 134 may coordinate selection or execution of a particular counterattack action of an available counterattack action with the detection agent 130. To illustrate, the detection agent 130 may send a secure message to the attack agent 134 that triggers selection and/or execution of the particular counterattack action by the attack agent 134.

The method 500 also includes, at 510, executing the one or more available counterattack actions. For example, the attack agent 134 may execute a counterattack action to terminate a program or process, to isolate (e.g., sandbox) a program or process, to take over control of a program, a process or a computing device, etc.

The method 500 may also include, at 512, transmitting counterattack activity data to the processing system, to other agents, or both, as encrypted messages. For example, before, during or after execution of a particular available counterattack action, the attack agent 134 may provide information to the processing system 102 or to the other agents 130 and 132 identifying the particular action to be performed, indicating a response to the particular action, or providing other information related to the particular action.

Thus, the process flow illustrated in FIG. 5 may enable an attack agent executing at a remote computing device to autonomously perform one or more counterattack actions of a set of available counterattack action and to notify the processing system and/or other agents of actions taken or results of such actions. The processing system may use the information received from the attack agent to generate new or updated agent criteria, which may be used to instantiate a new agent (e.g., a new detection agent, a new defense agent or a new attack agent) based on updated criteria (e.g., new detection criteria, a new set of available defense actions, a new set of available attack actions, or new criteria for executing or selecting particular available actions). The new agent may be provided to the remote computing device or to another computing device for execution. Additionally or in the alternative, other agents may use the information provided by the attack agent to select and/or execute other response actions, such as defense actions.

Figure 6:
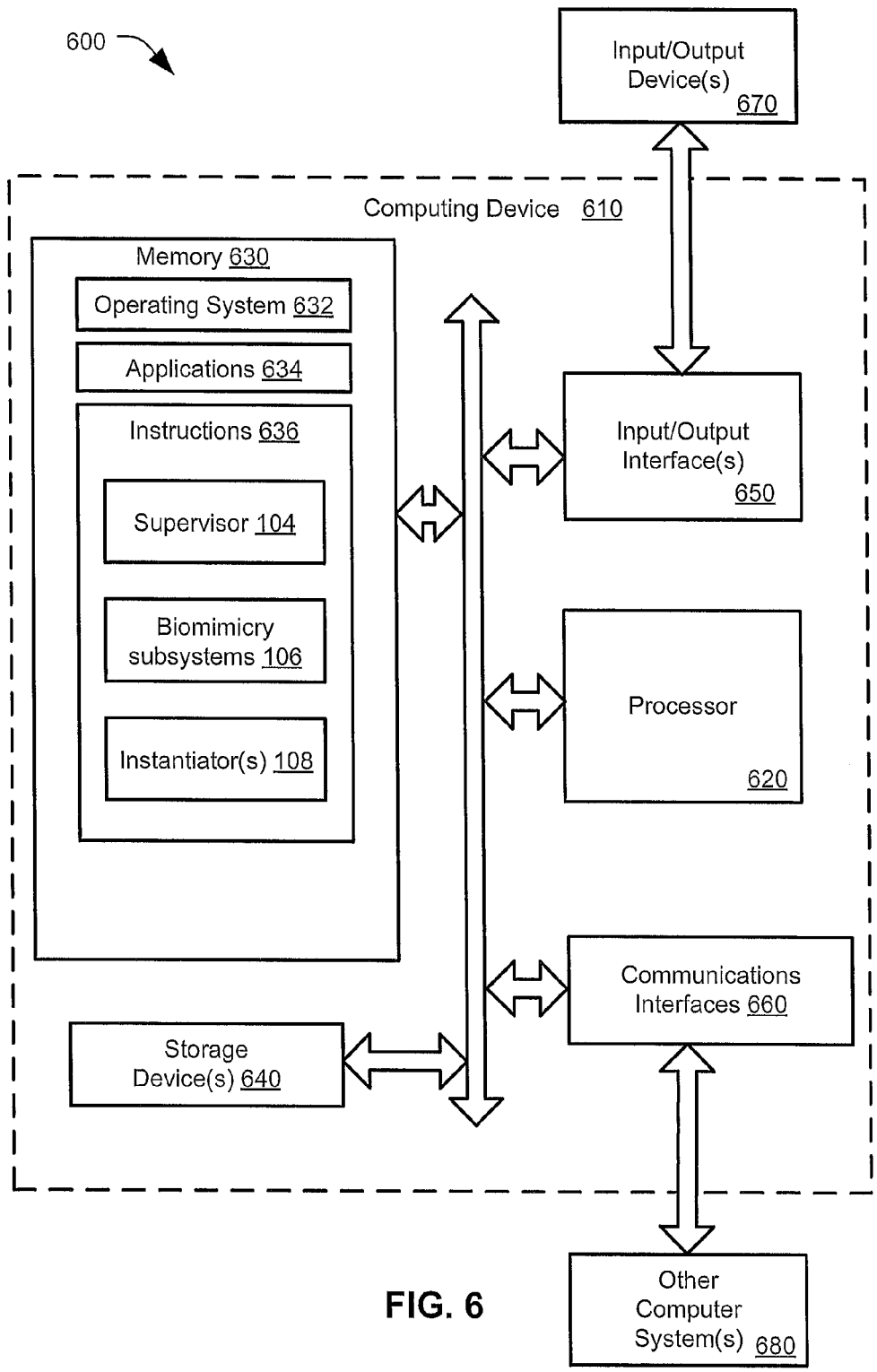
FIG. 6 is a block diagram that illustrates a particular embodiment of a computing system of a computer defense and counterattack system.

Referring to FIG. 6, a block diagram of a computing environment is shown and generally designated 600. The computing environment 600 includes a computing device 610 to support embodiments of computer-implemented methods and computer-executable program instructions (or code) according to the present disclosure. For example, the computing device 610, or portions thereof, may execute instructions to provide security for a network. In a particular embodiment, the computing device 610 may include, may be included with, or may correspond to the system 100 of FIG. 1. For example, the computing device 610 may execute the supervisor application 104 (or a portion thereof when the supervisor application 104 is a distributed application), may execute the biomimicry subsystems 106 (or a portion thereof when the biomimicry subsystems 106 are distributed), may execute the instantiators 108 (or a portion thereof when the instantiators 108 are distributed), or a combination thereof. Alternatively, the computing device 610 may include or correspond to the remote computing device 122, which may execute one or more agents, such as the agents 130-134.

The computing device 610 may include a processor 620 of FIG. 1. The processor 620 may communicate with a memory 630. The memory 630 may include volatile memory devices (e.g., random access memory (RAM) devices), nonvolatile memory devices (e.g., read-only memory (ROM) devices, programmable read-only memory, and flash memory), or both. The memory 630 may store data and/or instructions that are executable by the processor 620. For example, the memory 630 may store an operating system 632, which may include a basic/input output system for booting the computing device 610 as well as a full operating system to enable the computing device 610 to interact with users, other programs, and other devices. The memory 630 may include one or more application programs 634. For example, the application programs 634 may correspond to the programs and processes 124 of FIG. 1. The memory 630 may include instructions 636 corresponding to the supervisor application 104, the biomimicry subsystems 106, the instantiators 108, or a combination thereof.

The processor 620 may communicate with one or more storage devices 640. For example, the one or more storage devices 640 may include nonvolatile storage devices, such as magnetic disks, optical disks, or flash memory devices. The storage devices 640 may include both removable and non-removable memory devices. The storage devices 640 may be configured to store an operating system, images of operating systems, applications, and program data. In a particular embodiment, the memory 630, the storage devices 640, or both, include tangible, non-transitory computer-readable media.

The processor 620 may also communicate with one or more input/output interfaces 650 that enable the computing device 610 to communicate with one or more input/output devices 670 to facilitate user interaction. The input/output interfaces 650 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 670 may include keyboards, pointing devices, displays, speakers, microphones, touch screens, and other devices.

The processor 620 may communicate with other computer systems 680 (e.g., the remote computing device 122 of FIG. 1) via the one or more communications interfaces 660. The one or more communications interfaces 660 may include wired interfaces (e.g., Ethernet), wireless interfaces (e.g., an interface that operates according to a standard of the IEEE 802 family of standards), other wireless communication interfaces, or other network interfaces. The other computer systems 680 may include host computers, servers, workstations, and other computing devices. The computing device 610 may send agent program code for execution to the other computer systems 680 via the one or more communications interfaces 660. Similarly, the computing device 610 may receive agent data from agents executing at the other computer systems 680 via the one or more communications interfaces 660.

Although only one computing device 610 is illustrated in FIG. 6, in particular embodiments, the supervisor application 104, the biomimicry subsystems 106, the instantiators 108, or portions thereof, may be distributed among multiple computing devices, e.g., as a distributed computing system.

Examples described above illustrate but do not limit the disclosure. It should also be understood that numerous modifications and variations are possible in accordance with the principles of the present disclosure. Accordingly, the scope of the disclosure is defined by the following claims and their equivalents.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

What is claimed is:

1. A system comprising:
a processing system including one or more processors;
memory accessible to the processing system, wherein the memory stores instructions executable by at least one processor of the one or more processors to cause the at least one processor to:
  instantiate a first detection agent based on detection criteria, wherein the first detection agent includes first program code executable by a second processor to monitor network activity;
  send the first program code of the first detection agent to a remote computing device for execution, wherein, when the first program code of the first detection agent is executed at the remote computing device, the first detection agent is configured to:
    monitor operations of components of the remote computing device including operations of a trusted component,
    generate an operational signature corresponding to the monitored operations of the trusted component of the remote computing device,
    monitor network activity of the remote computing device based on the operational signature while emulating activity of the trusted component of the remote computing device, and
    transmit network activity data to the processing system, and wherein the processing system updates the detection criteria based on the network activity data and generates updated detection criteria;
  instantiate a second detection agent based on the updated detection criteria, wherein the second detection agent includes second program code; and
  send the second program code of the second detection agent to the remote computing device for execution.

2. The system of claim 1, wherein the stored instructions further cause the at least one processor to execute a supervisor application, wherein the supervisor application is executable to:
  analyze data received from one or more agents executing at one or more remote processors;
  initiate one or more actions automatically, without human intervention, based on the analysis; and
  notify a human operator of results of the data, results of the analysis, actions taken, or a combination thereof.

3. The system of claim 1, wherein emulating activity of the trusted component includes emulating a rhythm of activity of the trusted component, and wherein the first program code of the first detection agent further includes instructions to authenticate other agents and to exchange encrypted messages with the other agents independently of the processing system, and wherein the second program code deactivates the first detection agent.

4. The system of claim 1, wherein the first program code of the first detection agent is configured to monitor first detection criterion and is not configured to monitor second detection criterion, and wherein the second program code is executable by the second processor to monitor the second detection criterion.

5. The system of claim 1, wherein the stored instructions further cause the at least one processor to execute a supervisor application, wherein the supervisor application is executable to:
  instantiate a first defense agent based on a set of available defense actions, wherein the first defense agent includes third program code executable by the second processor to mitigate suspect network activity; and
  send the third program code of the first defense agent to the remote computing device for execution to mitigate particular suspect network activity that is detected by a particular detection agent.

6. The system of claim 5, wherein the supervisor application is further executable to:
  instantiate a second defense agent based on the updated detection criteria after the processing system generates updated detection criteria; and
  send fourth program code of the second defense agent to the remote computing device for execution.

7. The system of claim 5, wherein, when the first defense agent is executed at the remote computing device, the first defense agent causes suspect network activity mitigation data to be transmitted to the processing system, and wherein the processing system updates the detection criteria to generate the updated detection criteria further based on the suspect network activity mitigation data.

8. The system of claim 5, wherein, when the first defense agent is executed at the remote computing device, the first defense agent causes suspect network activity mitigation data to be transmitted to the processing system, and wherein the processing system updates the set of available defense actions to generate an updated set of available defense actions based on the suspect network activity mitigation data.

9. The system of claim 5, wherein the first detection agent is configured to communicate detection data to the first defense agent at the remote computing device, wherein the detection data indentifies suspect network activity detected by the first detection agent, and wherein the first defense agent is configured to automatically select and execute a particular defense action, independently of the processing system, based on the detection data.

10. The system of claim 5, wherein the set of available defense actions includes a first subset of available defense actions and a second subset of available defense actions, and wherein the third program code of the first defense agent is configured to execute the first subset of available defense actions and is not configured to execute the second subset of available defense actions.

11. The system of claim 10, wherein the supervisor application is further executable to:
instantiate a second defense agent including fourth program code executable by the second processor to execute one or more defense actions of the second subset of defense actions; and
send the fourth program code of the second defense agent to the remote computing device.

12. The system of claim 1, wherein the supervisor application is further executable to:
instantiate a first attack agent based on a set of available counterattack actions, wherein the first attack agent includes fifth program code executable by the second processor to execute a counterattack based on suspect network activity; and
send the fifth program code of the first attack agent to the remote computing device for execution based on the suspect network activity detected by a particular detection agent.

13. The system of claim 12, wherein the supervisor application is further executable to:
instantiate a second attack agent based on the updated detection criteria after the processing system generates updated detection criteria; and
send sixth program code of the second attack agent to the remote computing device for execution.

14. The system of claim 12, wherein, when the first attack agent is executed at the remote computing device, the first attack agent causes counterattack activity data to be transmitted to the processing system, and wherein the processing system updates the set of available counterattack actions to generate an updated set of available counterattack actions based on the counterattack activity data.

15. A method comprising:
instantiating, at a first computing device, a first detection agent based on detection criteria, wherein the first detection agent includes first program code executable by a second computing device to monitor network activity;
sending the first program code of the first detection agent to the second computing device for execution, wherein, when the first program code of the first detection agent is executed at the second computing device, the first detection agent:
monitors operations of components of the second computing device including operations of a trusted component;
generates an operational signature corresponding to the monitored operations of the trusted component of the second computing device;
monitors network activity of the second computing device based on the operational signature while emulating activity of the trusted component of the second computing device; and
causes network activity data to be transmitted to a processing system, and wherein the processing system updates the detection criteria based on the network activity data and generates updated detection criteria;
instantiating, at the first computing device, a second detection agent based on the updated detection criteria; and
sending second program code of the second detection agent to the second computing device for execution.

16. The method of claim 15, further comprising:
instantiating at least one additional agent, the at least one additional agent including a defense agent, an attack agent, or both; and
sending program code of the at least one additional agent to the second computing device for execution.

17. The method of claim 16, further comprising, before instantiating the at least one additional agent, selecting operations to be performed by the at least one additional agent based on the network activity data, wherein the program code of the at least one additional agent includes instructions executable by the second computing device to perform the selected operations.

18. A computer-readable storage device storing instructions that are executable by a processor to cause the processor to:
instantiate a first detection agent based on detection criteria, wherein the first detection agent includes first program code executable by a remote computing device to monitor network activity;
send the first program code of the first detection agent to the remote computing device for execution, wherein, when the first program code of the first detection agent is executed at the remote computing device, the first detection agent is configured to:
monitor operations of components of the remote computing device including operations of a trusted component,
generate an operational signature corresponding to the monitored operations of the trusted component of the remote computing device,
monitor network activity of the remote computing device based on the operational signature whereby the first detection agent emulates activity of the trusted component of the remote computing device, and
transmit network activity data to a processing system, and wherein the processing system updates the detection criteria based on the network activity data to generate updated detection criteria;
instantiate a second detection agent based on the updated detection criteria; and
send second program code of the second detection agent to the remote computing device for execution.

19. The computer-readable storage device of claim 18, wherein the instructions further cause the processor to execute a supervisor application, wherein the supervisor application is executable to:
analyze data received from one or more agents executing at one or more remote computing devices;
initiate one or more actions automatically, without human intervention, based on the analysis; and
notify a human operator of results of the data, results of the analysis, actions taken, or a combination thereof.

20. The computer-readable storage device of claim 18, wherein the first program code of the first detection agent further includes instructions to authenticate other agents, to exchange secure messages with the other agents, and to send the network activity data as one or more encrypted messages to the processing system and to one or more other agents; and wherein the second program code deactivates the first detection agent.

\* \* \* \* \*